(No Model.)
W. P. ROBERTS.
ANIMAL CATCHER.
No. 506,864. Patented Oct. 17, 1893.
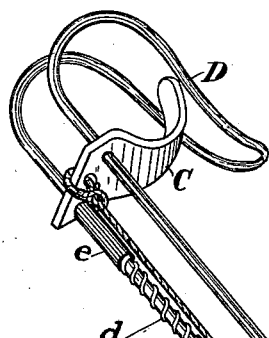
Fig. 1.
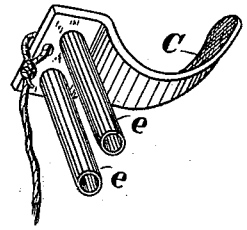
Fig. 3.
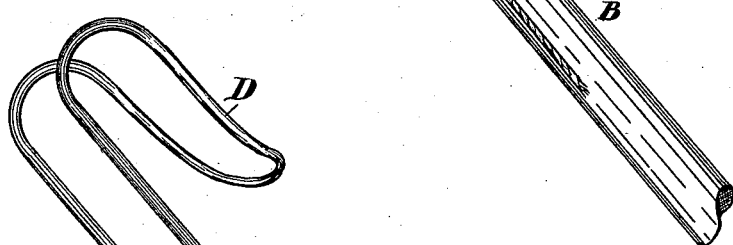
Fig. 2.
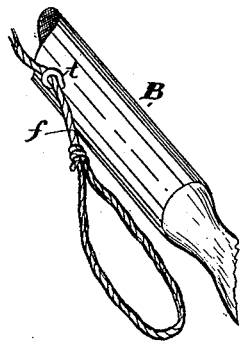
Witnesses:
Inventor:
William P. Roberts

UNITED STATES PATENT OFFICE.

WILLIAM P. ROBERTS, OF EVANSVILLE, WISCONSIN.

ANIMAL-CATCHER.

SPECIFICATION forming part of Letters Patent No. 506,864, dated October 17, 1893.

Application filed December 14, 1891. Serial No. 415,067. (No model.)

*To all whom it may concern:*

Be it known that I, WILLIAM P. ROBERTS, a citizen of the United States, residing at Evansville, Rock county, State of Wisconsin, have invented a new and useful Improvement in Animal-Catchers; and I do hereby declare that the following is a full, clear, and exact description of my invention, which will enable others skilled in the art to which it appertains to make and use the same.

My invention relates to an improved device for catching and leading animals, such as sheep, swine, calves, &c., and is illustrated in the accompanying drawings, in which—

Figure 1 is a perspective view of the device complete, showing the handle, the hook, formed of a single wire bent upon itself, the follower sliding upon the shank or straight stem of the hook and provided with a short tube or sleeve sliding on one part of the said stem of the hook. Fig. 2 shows a modified form of the device as illustrated in Fig. 1, and Fig. 3 is a detail view of the follower as shown in Fig. 2.

Similar letters of reference refer to correspondingly like parts throughout the several figures.

This invention consists of a hook, a follower constructed to close the opening in said hook and a handle attached to said hook with means to operate the follower from the end of the handle.

Referring to the drawings D, represents a hook constructed of double wire of sufficient stiffness, bent to the desired shape. This hook D is formed from a piece of wire, doubled at its center, the doubled portion bent in the form of a hook and the ends extending in parallel directions form two legs A and A' which meet and are securely fastened into the end of a pole B—as shown in Figs. 1 and 3 of the drawings.

Upon the parallel legs A and A' of the hook D is a follower C adapted to slide thereon and normally close the entrance to hook D. This follower is constructed from a flat piece of metal curved slightly upward and tapered into an end which latter is sufficiently narrow to pass between the wire forming the hook D. The opposite end of the follower C is provided with two holes to receive the legs A and A' and in these holes are fastened one or more short tubes $e$, $e$, which serve as guides to allow the follower to more easily slide upon said legs, and also to prevent the follower C from twisting or binding said legs. This follower C is retained in its upper position within the hook D by means of spiral springs $d$ and $d'$ also located upon the legs A, A', and a cord $f$ is attached to the said follower, which cord extends down the pole B to a convenient length and is attached to the latter by means of small eyes $t$, $t$, through which it passes.

My invention thus described is used as follows:—The mouth of the hook D is opened by pulling down the follower C by means of the cord $f$ which of course compresses the spiral springs $d$, $d'$. The cord $f$ is now held by the hand of the operator at the end of the pole B and with the follower in retracted position the pole is used as a means to engage the hook D, about one of the legs of the animal. As soon as the animal is hooked, the cord $f$ is freed, which movement allows the spiral springs to relax and force the follower C within the open part of the hook D, and against the animal's leg which will now be entirely bound by the hook and follower. The animal can now be guided or held as desired and the follower C prevents the animal's leg from being released; and by means of the springs will conform to either a large or small leg, requiring but one size for all animals. The conforming of the follower C to the size of the leg by means of the springs $d$, $d'$ prevents unnecessary wear and chafing, and thus will not irritate the animal, which can be instantly released at any time by simply pulling the cord $f$.

Having thus described my invention and the particular manner in which it is used, what I claim, and desire to secure by Letters Patent of the United States, is—

1. An improved animal catcher consisting of a hook attached to one end of a pole, and comprising parallel legs A, A', a follower sliding upon the said legs, springs also upon the legs and adapted to retain the follower in normal position, closing the mouth of the hook, and means for retracting the follower from the mouth of the hook, substantially as described.

2. An improved animal catcher consisting of a hook formed of a single piece of wire bent upon itself and comprising parallel legs A, A', a follower provided with openings through which the legs pass, sleeves e, secured at one end to the follower and loosely embracing the legs, whereby the follower is slidable on the legs, springs abutting against the sleeves at one end and adapted to retain the follower in normal position closing the mouth of the hook, and an operating cord attached at one end to the follower for retracting the same from the mouth of the hook, substantially as described.

WILLIAM P. ROBERTS.

Witnesses:
FRED JOHNSON,
FRANK E. SOUTHARD.